(12) United States Patent
Kumar et al.

(10) Patent No.: US 11,397,749 B2
(45) Date of Patent: Jul. 26, 2022

(54) ASYNCHRONOUS REPLICATION OF IN-SCOPE TABLE DATA

(71) Applicant: International Business Machines Corporation, Armonk, NY (US)

(72) Inventors: Nirmal Kumar, Bangalore (IN); Gaurav Mehrotra, Pune (IN); Hrishikesh Sujaya Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 16/411,265

(22) Filed: May 14, 2019

(65) Prior Publication Data
US 2020/0364239 A1 Nov. 19, 2020

(51) Int. Cl.
*G06F 16/27* (2019.01)
*G06F 16/23* (2019.01)
*G06F 16/22* (2019.01)
*G06F 16/28* (2019.01)

(52) U.S. Cl.
CPC ........ *G06F 16/273* (2019.01); *G06F 16/2282* (2019.01); *G06F 16/2358* (2019.01); *G06F 16/2365* (2019.01); *G06F 16/284* (2019.01)

(58) Field of Classification Search
CPC . G06F 16/273; G06F 16/2358; G06F 16/2365
See application file for complete search history.

(56) References Cited

U.S. PATENT DOCUMENTS

| 9,898,703 | B2 | 2/2018 | Carriere |
| 10,216,820 | B1 | 2/2019 | Holenstein |
| 10,387,399 | B1 * | 8/2019 | McKelvie ............... G06F 16/23 |
| 2011/0072207 | A1 * | 3/2011 | Jin ....................... G06F 16/2358 |
| | | | 711/E12.001 |

(Continued)

OTHER PUBLICATIONS

Fogel et al., "Managing the Redo Log", Oracle Database Administrator's Guide 10g Release 2(10.2) B14231-02, Part II, Chapter 6, May 2006, 23 pages.

(Continued)

*Primary Examiner* — Robert W Beausoliel, Jr.
*Assistant Examiner* — Pedro J Santos
(74) *Attorney, Agent, or Firm* — Aaron N. Pontikos

(57) ABSTRACT

A computer-implemented method includes writing a plurality of change records to a first set of redo records in a first transaction log file. The computer-implemented method further includes determining, while writing a change record to a redo record, that the change record includes changes made to data associated with an in-scope table. The computer-implemented method further includes updating the first transaction log file with information indicating that the redo record includes changes made to data associated with the in-scope table. The computer-implemented method further includes accessing the first transaction log file from storage in response to receiving a request for replicating changes made to data associated with in-scope tables. The computer-implemented method further includes scraping a first redo record in the first transaction log file in response to determining that the first redo record includes at least one change record associated with the in-scope table.

13 Claims, 7 Drawing Sheets

(56) References Cited

U.S. PATENT DOCUMENTS

| | | | |
|---|---|---|---|
| 2015/0278281 A1* | 10/2015 | Zhang | G06F 16/2246 |
| | | | 707/703 |
| 2018/0246886 A1 | 8/2018 | Dragomirescu | |
| 2018/0253483 A1* | 9/2018 | Lee | G06F 16/23 |
| 2018/0336022 A1 | 11/2018 | Eberlein | |
| 2019/0095297 A1* | 3/2019 | Neall | G06F 11/2082 |
| 2020/0364239 A1* | 11/2020 | Kumar | G06F 16/2282 |

OTHER PUBLICATIONS

Mell et al., "The NIST Definition of Cloud Computing", National Institute of Standards and Technology, U.S. Department of Commerce, Special publication 800-14, Sep. 2011, 7 pages.

* cited by examiner

ASYNCHRONOUS REPLICATION OF IN-SCOPE TABLE DATA

BACKGROUND

The present invention relates generally to the field of relational database management systems, and more particularly to data replication between relational databases.

A relational database management system (RDBMS) is a type of database management system (DBMS) used to perform create, update, read and delete functions on a relational database. With a relational database, data is organized in tables containing rows and columns. Each table (i.e., "relation") includes one or more columns comprised of data categories or "attributes." Each row (i.e., record or tuple) includes a unique instance of data for those categories defined by the columns. Each table further has a unique primary key, which identifies the information included in the table. The relationship between tables is tracked by a foreign key, which is a field in a table that links to the primary key of another table.

Data replication is the process of storing redundant copies of data between multiple databases, such that data consistency is maintained between each copy. Data replication encompasses duplication of transactions (e.g., data manipulation language (DML) operations) made to data stored on a primary database to the same data (i.e., replica) stored on a secondary database. There are two primary methods for data replication—asynchronous replication and synchronous replication. With asynchronous replication, data or changes to data are written to the primary database first and then copied to a replica stored on the secondary database. With synchronous replication, data or changes to data are simultaneously written to the primary database and the replica stored on the secondary database. However, in either method, by duplicating changes made to source data between replicas located on separate databases, data reliability, accessibility and fault-tolerance is improved.

SUMMARY

According to one embodiment of the present invention, a computer-implemented method for asynchronous replication between a source database and a target database is disclosed. The computer-implemented method includes writing a plurality of change records to a first set of redo records in a first transaction log file. The computer-implemented method further includes determining, while writing a change record to a redo record of the first transaction log file, that the change record includes changes made to data associated with an in-scope table. The computer-implemented method further includes updating the first transaction log file with information indicating that the redo record includes changes made to data associated with the in-scope table. The computer-implemented method further includes archiving the first transaction log file in storage upon filling a memory space of the first transaction log file. The computer-implemented method further includes accessing the first transaction log file from the storage in response to receiving a request for replicating changes made to data associated with in-scope tables from a source database to a target database. The computer-implemented method further includes scraping a first redo record in the first set of redo records in the first transaction log file in response to determining that the first redo record includes at least one change record associated with the in-scope table.

According to another embodiment of the present invention, a computer program product for asynchronous replication between a source database and a target database is disclosed. The computer program product includes one or more computer readable storage media and program instructions stored on the one or more computer readable storage media. The program instructions include instructions to write a plurality of change records to a first set of redo records in a first transaction log file. The program instructions further include instructions to determine, while writing a change record to a redo record of the first transaction log file, that the change record includes changes made to data associated with an in-scope table. The program instructions further include instructions to update the first transaction log file with information indicating that the redo record includes changes made to data associated with the in-scope table. The program instructions further include instructions to archive the first transaction log file in storage upon filling a memory space of the first transaction log file. The program instructions further include instructions to access the first transaction log file from the storage in response to receiving a request for replicating changes made to data associated with in-scope tables from a source database to a target database. The program instructions further include instructions to scrape a first redo record in the first set of redo records in the first transaction log file in response to determining that the first redo record includes at least one change record associated with the in-scope table.

According to another embodiment of the present invention, a computer system for asynchronous replication between a source database and a target database is disclosed. The computer system includes one or more computer system includes one or more computer processors, one or more computer readable storage media, and program instructions stored on the computer readable storage media for execution by at least one of the one or more processors. write a plurality of change records to a first set of redo records in a first transaction log file. The program instructions further include instructions to determine, while writing a change record to a redo record of the first transaction log file, that the change record includes changes made to data associated with an in-scope table. The program instructions further include instructions to update the first transaction log file with information indicating that the redo record includes changes made to data associated with the in-scope table. The program instructions further include instructions to archive the first transaction log file in storage upon filling a memory space of the first transaction log file. The program instructions further include instructions to access the first transaction log file from the storage in response to receiving a request for replicating changes made to data associated with in-scope tables from a source database to a target database. The program instructions further include instructions to scrape a first redo record in the first set of redo records in the first transaction log file in response to determining that the first redo record includes at least one change record associated with the in-scope table.

DETAILED DESCRIPTION

Figure 1:
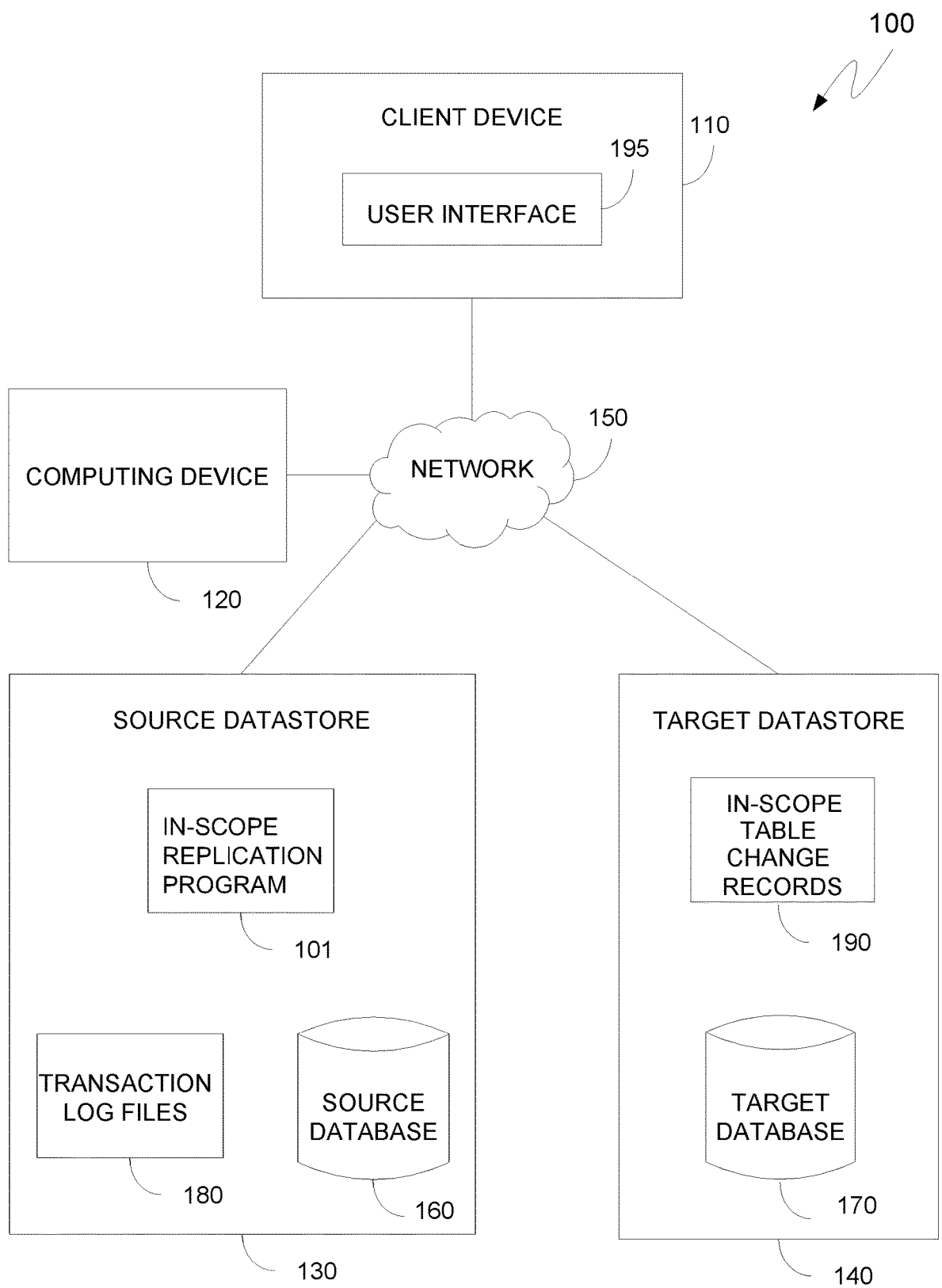
FIG. 1 is a functional block diagram illustrating a network computing environment, generally designated 100, suitable for operation of an in-scope replication program 101 in accordance with at least one embodiment of the invention.

A relational database management system (RDBMS) creates and archives transaction log files that detail the changes made to data stored on a source database. Typically, transaction log files include the information needed to recover the results of program execution, the contents of the database, and the location of the subsystem (i.e., the particular instance of the RDBMS) where the data is stored. More particularly, transaction log files include individual records (i.e., redo records or redo entries), each of which include one or more change records (i.e., change vectors) that describe a change made to a single data block (i.e., logical block) in the database. For example, if a user updates a salary value in a table including employee-related data, the RDBMS generates a redo record that includes one or more change-vectors that describe the changes made to a single data block for the table.

The records included in transaction log files can be utilized for multiple purposes, including: (i) disaster recovery (e.g., if a database crashes, the RDBMS can redo (i.e., reprocess) all changes made to the data such that the database can be returned to the exact state that the database previously existed up to the last record that was written), (ii) data integrity (e.g., if changes are made to data due to performance of erroneous operations, the RDBMS can undo the changes and restore the database to a state prior to the performance of the erroneous operations) and (iii) data replication (e.g., changes made to data recorded in a record are captured and used to duplicate the changes between replicas located on separate databases).

Typically, replication of data between a source database and a target database has two phases. The first phase pertains to the initial synchronization (i.e., refreshing) of tables located on a target database with tables located on a source database. This occurs when replication is not currently being performed between the source database and the target database. In some instances, the initial synchronization of a target table can be performed while changes are actively being made to a source table.

The second phase pertains to maintaining synchronization (i.e., continuous mirroring) between source tables and target tables after the initial synchronization is completed. Accordingly, changes to data stored on a source database are continuously replicated to data stored on a target database. Typically, during continuous mirroring, changes to data (resulting from INSERT/UPDATE/DELETE operations) stored in the source database and associated metadata are captured from the redo records created in a transaction log file and transmitted to the target database. The same INSERT/UPDATE/DELETE operations resulting in changes made to the source data are then performed on the target replica data in the same sequence. One of ordinary skill will appreciate that continuous mirroring can be performed on a table by table basis. Accordingly, a user or system administrator can select which particular source tables to replicate (i.e., in-scope tables) and which particular source tables not to replicate (i.e., out-of-scope tables).

Embodiments of the present invention recognize several deficiencies with current replication technologies and particularly, asynchronous replication systems. Typically, anywhere from a few terabytes to upwards of ten terabytes of data can be replicated from a single source database system (e.g., a standalone database or multiple node database) in a twenty-four hour period. The amount of data to be replicated is dictated by the number of transactions or changes made to the data. Thus, as the number of transactions or changes made to data increases, the amount of data that needs to be replicated increases. If the amount of data that needs to be replicated exceeds the performance capacity of the DBMS, the ability to capture changes made to data written to redo records is delayed. This results in system latency, which ultimately causes a delay in the replication of data between a source database and a target database.

Embodiments of the present invention recognize that oftentimes, system latency is not the result of a systems replication requirements (i.e., an amount of data to be replicated per unit of time) exceeding the systems replication capabilities (i.e., an amount of data that a system is capable of replicating per unit of time), but rather the systems inability to efficiently capture the changes made to data recorded in redo records. This stems from the fact that current replication systems generate redo records for changes made to any table on a source database, regardless of whether a table has been selected for replication. In other words, redo records are generated regardless of whether the changes made to data recorded in a redo record are associated with data stored in an in-scope table or an out-of-scope table.

Generally, a transaction log file corresponds to a predetermined number of data blocks of fixed size, wherein a single data block can include multiple redo records or a single redo record can span multiple data blocks. Current replication systems utilize a block by block approach for identifying changes made to data associated with in-scope tables since current transaction log file headers and redo record headers do not include such information. Thus, according to current approaches, whether a transaction log file and/or a particular redo record includes changes to data associated with an in-scope table is only discoverable by scraping the entire body of each individual redo record.

Embodiments of the present invention recognize that this block by block approach is time consuming and an inefficient use of computing resources since oftentimes only a subset of tables stored on a source database are designated as in-scope tables. Thus, only a subset of the data blocks corresponding to a transaction log file may store changes made to data associated with the selected subset of in-scope tables. Accordingly, only a subset of redo records of a transaction log file includes changes made to data associated with in-scope tables that require data scraping.

For example, if a source database includes one-thousand tables, a system administrator may only designate one-hundred tables as in-scope tables. Similarly, if a transaction log file is constructed from one-hundred data blocks of a fixed size, only a subset of the data blocks may include change records associated with in-scope tables (e.g., twenty data blocks). According to current approaches, although only twenty percent of the data blocks may include changes made to data associated with in-scope tables, one-hundred percent of the redo records included in the transaction log file must be sequentially scraped by a log reader and log parser to: (i) identify the changes made to data stored on a data block of a source system and (ii) determine whether or not the changes to the data stored on a data block are associated with an in-scope table. Thus, by parsing one-hundred redo records in order to find only ten redo records that include changes made to data that are associated with in-scope tables, a significant waste of time and computing resources is evinced.

Embodiments of the present invention improve the performance of replication systems by reducing and/or eliminating latency issues caused by current data scraping methods. In various embodiments, a header of a transaction log file for a source datastore is modified and/or updated to include a replication index having: (i) a first column that lists the redo records (and their respective object IDs) that include change records associated with in-scope tables and (ii) a second column that lists references that point to the unique network addresses of data blocks where a particular redo record can be located. The replication index is updated as change records are written to a redo record of a transaction log file. Accordingly, when asynchronous replication is required between the source datastore and a target datastore, only those redo records that are pointed to are scraped. Similarly, scraping of redo records that include change records associated with data stored in out-of-scope tables is automatically avoided since these redo records are not pointed to.

In various embodiments, a header of a redo record is modified and/or updated to include additional information, such as metadata or a flag, that indicates whether a redo record includes change records associated with in-scope tables. The header of a redo record is updated as each change record is written to the redo record. Accordingly, when asynchronous replication is required between a source datastore and a target datastore, only those redo records that are indicated as including change records associated with data stored in in-scope tables are scraped. Similarly, scraping of redo records that are indicated as including change records associated with data stored in out-of-scope tables is automatically avoided.

Accordingly, embodiments of the present invention significantly reduce the amount of time and computing resources consumed while replicating data by scraping only those redo records that include changes made to data associated with in-scope tables, thereby ultimately reducing and/or eliminating latency issues during the replication process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram illustrating a network computing environment, generally designated 100, suitable for operation of an in-scope replication program 101 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes client device 110, computing device 120, source datastore 130 and target datastore 140 interconnected over network 150. In embodiments of the invention, network 150 can be a telecommunications network, a local area network (LAN), a wide area network (WAN), such as the Internet, or a combination of the three, and can include wired, wireless, or fiber optic connections. Network 150 can include one or more wired and/or wireless networks that are capable of receiving and transmitting data, voice, and/or video signals, including multimedia signals that include voice, data, and video information. In general, network 150 can be any combination of connections and protocols that will support communications between client device 110, computing device 120, source datastore 130, target datastore 140 and other computing devices (not shown) within network computing environment 100.

In various embodiments of the invention, client device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, client device 110 represents any programmable electronic devices or combination of programmable electronic devices capable of executing machine readable program instructions and communicating with computing device 120, source datastore 130, target datastore 140 and other computing devices (not shown) within network computing environment 100 via a network, such as network 150.

In some embodiments, client device 110 allows a user to access an application running on computing device 120 via a network, such as network 150. In some embodiments, client device 110 allows a user to communicate with in-scope replication program 101 via a network, such as network 150. In some embodiments, client device 110 allows a user to access data stored on source datastore 130 and/or target datastore 140. For example, in-scope replication program 101 receives read (R) requests from client device 110 via computing device 120 and in turn, retrieves the requested data from source database 160 and/or target database 170. In another example, in-scope replication program 101 receives data manipulation language (DML) operations from client device 110 via computing device 120 and in turn, writes changes to data on source database 160.

In embodiments of the invention, client device 110 allows a user or system administrator to configure, monitor and manage data replication between source datastore 130 and target datastore 140. For example, client device 110 communicates with in-scope replication program 101 to: (i) specify replication parameters, (ii) initiate an initial synchronization (i.e., refresh) of tables located on target database 170 with tables located on source database 160, (iii) initiate continuous mirroring between source tables located in source database 160 and target tables located in target database 170 after an initial synchronization is completed, (iv) specify log writing parameters with respect to the creation and archival of transaction log files and redo records and (v) monitor system performance, latency, event messages and other statistics supported by computing device 120, source datastore 130 and target datastore 140.

Client device 110 includes user interface 195. User interface 195 provides an interface between client device 110, computing device 120, source datastore 130, target datastore 140 and in-scope replication program 101. In some embodiments, user interface 195 can be a graphical user interface (GUI) or a web user interface (WUI) and can display text, documents, web browser windows, user options, application interfaces and instructions for operation, and includes the information (such as graphic, text, and sound) that a program presents to a user and the control sequences the user employs to control the program. In other embodiments, user interface 195 can be mobile application software that provides an interface between client device 110, computing device 120, source datastore 130, target datastore 140 and in-scope replication program 101.

In various embodiments of the invention, computing device 120 is a computing device that can be a standalone device, a management server, a web server, an application server, a mobile device, or any other electronic device or computing system capable of receiving, sending, and processing data. In other embodiments, computing device 120 represents a server computing system utilizing multiple computers as a server system, such as in a cloud computing environment. In an embodiment, computing device 120 represents a computing system utilizing clustered computers and components (e.g. database server computers, application server computers, web server computers, media server computers, etc.) that act as a single pool of seamless resources when accessed within network computing environment 100. In general, computing device 120 represents any programmable electronic device or combination of programmable electronic devices capable of executing machine readable program instructions and communicating with each as other, as well as with client device 110, source datastore 130, target datastore 140 and in-scope replication program 101 within network computing environment 100 via a network, such as network 150.

In various embodiments of the invention, source datastore 130 and target datastore 140 are data repositories for persistently storing and managing collections of data. Source datastore 130 includes source database 160, transaction log files 180 and in-scope replication program 101. Target datastore 140 includes target database 170 and in-scope table change records 190. In embodiments of the invention, source datastore 130 and target datastore 140 are accessed by in-scope replication program 101, client device 110 and/or computing device 120. In some embodiments, source datastore 130 and target datastore 140 are part of a storage area network (SAN). In some embodiments, source datastore 130 and target datastore 140 are part of network attached storage (NAS). In other embodiments, source datastore 130 and target datastore 140 are formed from a combination of NAS and a SAN.

In some embodiments, source database 160 and target database 170 are non-relational databases (i.e., NoSQL databases). In other embodiments, source database 160 and target database 170 are relational databases (i.e., SQL databases). In an embodiment, source database 160 and target database 170 provide block-level storage where data is stored as data blocks. In an embodiment, source database 160 and target database 170 provide file-level storage where data is stored as files. In an embodiment, source database 160 and target database 170 provide object-level storage where data is stored as objects.

In embodiments of the invention, changes to data written to source database 160 that are associated with in-scope tables are replicated to target database 170. In some embodiments, changes made to data written to source database 160 that are associated within in-scope tables are continuously mirrored with a data replica stored in target database 170. In other embodiments, changes to data written to source database 160 that are associated within in-scope tables are asynchronously replicated with a data replica stored in target database 170. One of ordinary skill will appreciate that any number of data replicas can be stored in any number of databases located within the same target datastore, any number of databases located within physically distinct datastores and/or any combination thereof.

In embodiments of the invention, source database 160 and target database 170 receive input/output requests (i.e., read (R) and write (W) requests) from in-scope replication program 101, client device 110 and computing device 120. In some embodiments, source database 160 receives input/output requests from target database 170 and vice versa. In embodiments of the invention, source database 160 and target database 170 perform data manipulation language operations (i.e., create, update and delete operations) to data stored on source database 160 and target database 170, respectively.

Source datastore 130 includes in-scope replication program 101. Although in-scope replication program 101 is depicted in FIG. 1 as being integrated with source datastore 130, in alternative embodiments, in-scope replication program 101 is remotely located from source datastore 130. For example, in-scope replication program 101 can be integrated with computing device 120. In another example, in-scope replication program 101 can be integrated with target datastore 140. In yet another example, in-scope replication program 101 can be integrated with each of computing device 120, source datastore 130, target datastore 140 and/or any combination thereof. Computing device 120, source datastore 130 and target datastore 140 may include internal and external hardware components, as depicted and described in further detail with respect to FIG. 5.

Figure 2:
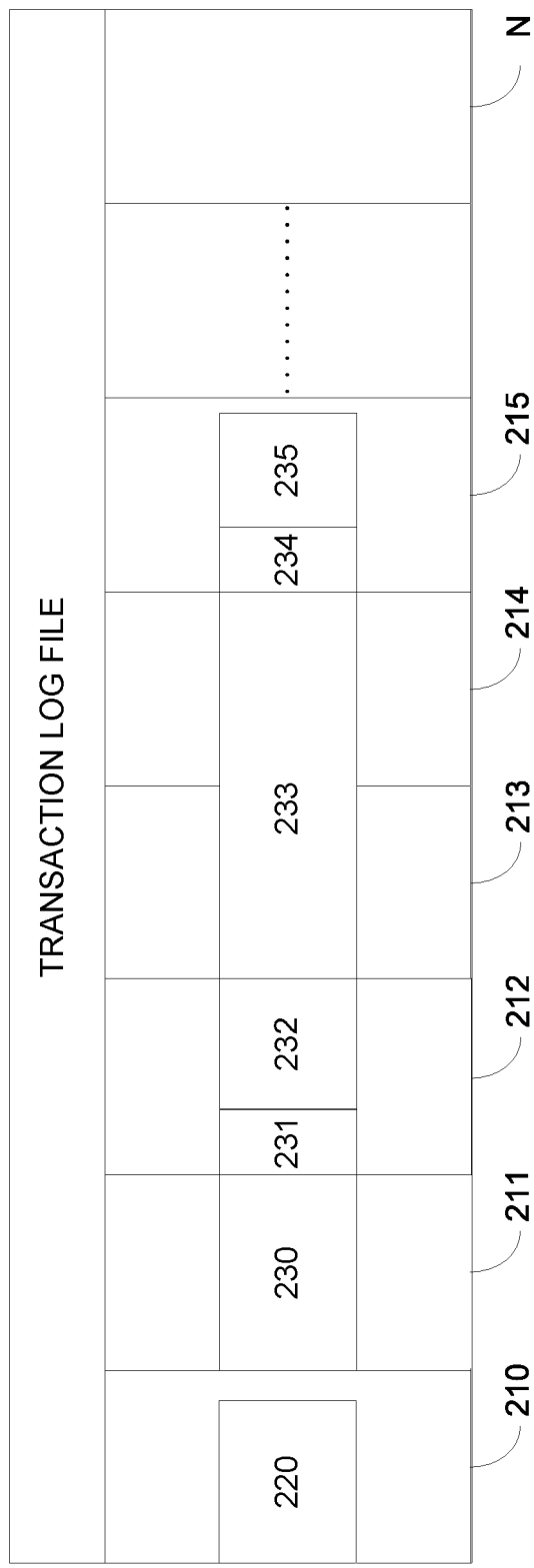
FIG. 2 is a block diagram illustrating an exemplary transaction log file in accordance with at least one embodiment of the invention.

FIG. 2 is a block diagram illustrating an exemplary transaction log file, generally designated 200, in accordance with at least one embodiment of the invention. Transaction log file 200 includes data block 220, data block 221, data block 222, data block 223, data block 224, data block 225 and data block N. Each data block included in transaction log file 200 is the same size. For example, each data block is 512 bytes. In another example, each data block is 1024 bytes. However, one of ordinary skill will appreciate that a transaction log file can include any number of data blocks of any fixed size.

Transaction log file 200 includes transaction log file header 220, which is stored on data block 210. However, one of ordinary skill will appreciate that transaction log file header 220 may be any size and span any number of data blocks. In this exemplary embodiment, transaction log file header 220 includes, but is not limited to the following information: (i) the name or unique network address of the database, (ii) thread number (for when multiple instances of data exist), (iii) start time, (iv) end time, start system change number (SCN) and end SCN.

As further depicted in FIG. 2, a plurality of redo records are stored on various data blocks of transaction log file 200. Redo record 230 is stored on data block 211 and is substantially similar in size to data block 211. Redo record 231 is stored on data block 212 and is a portion of the size of data block 212. Redo record 232 is stored sequentially to redo record 231 and encompasses a portion of data block 212. Redo record 233 is stored sequentially to redo record 232 and encompasses a portion of data block 212, all of data block 213 and all of data block 214. Redo record 234 and redo record 235 are stored on data block 215 and are of various size.

Each redo record includes a redo header and a redo body. In this exemplary embodiment, a redo header includes, but is not limited to the following information: (i) transaction log file thread number, (ii) unique transaction identifier representing the transaction, (iii) unique record identifier identifying the position of a record in the transaction file (e.g., <sequence_number>.<block_number>.<offset>), (iv) length of the redo record, (v) start system change number (SCN) of the redo record and (vi) timestamp (e.g., 04/09/2019 10:50:47). In this exemplary embodiment, a redo body includes one or more change records (i.e., change vectors).

Figure 3:
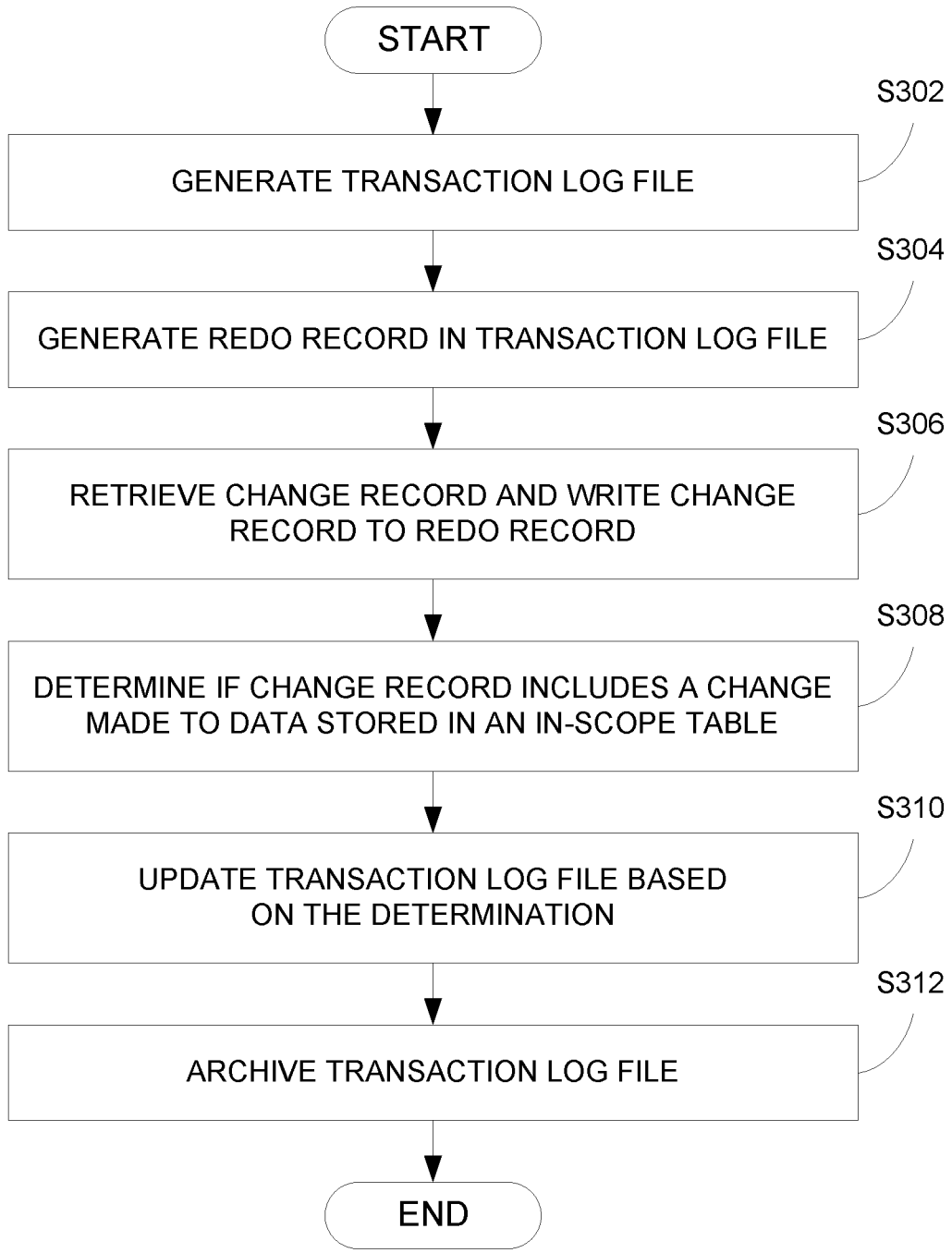
FIG. 3 is a flow chart diagram depicting operational steps by in-scope replication program 101 for configuring a transaction log file for identifying redo records having change records associated with in-scope tables in accordance with at least one embodiment of the invention.

FIG. 3 is a flow chart diagram depicting operational steps by in-scope replication program 101 for configuring a transaction log file for identifying redo records having change records associated with in-scope tables in accordance with at least one embodiment of the invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, in-scope replication program 101 generates a transaction log file. In embodiments of the invention, a transaction log file includes a predetermined number of data blocks (i.e., logical blocks) of fixed size, wherein each data block corresponds to a specific number of bytes of physical memory space. For example, a transaction log file can include one-thousand data blocks each having a block size of 512 bytes. In another example, a transaction log file can include ten-thousand data blocks each having a block size of 1024 bytes. However, one of ordinary skill will appreciate that a transaction log file can include any number of data blocks of any fixed size. In embodiments of the invention, in-scope replication program 101 generates an additional transaction log file once a previous transaction log file is full (i.e., no free data space remains).

In embodiments of the invention, in-scope replication program 101 creates a transaction log file header at the start of each transaction log file. For example, the transaction log file header is located on the first data block of the transaction log file. In another example, the transaction log file header spans the first two data blocks of the transaction log file. In various embodiments, in-scope replication program 101 updates the information stored in the file header while writing change records to subsequently created redo records.

At step S304, in-scope replication program 101 generates a redo record in the transaction log file. In embodiments of the invention, the size of a redo record is dependent on the number of changes made to data stored on a single data block of a database, such as source storage 160. Accordingly, a single redo record can span multiple data blocks of the transaction log file or multiple redo records can be written to a single data block of the transaction log file. Each redo record includes a redo header and a redo body, in which the redo body includes one or more change records.

At step S306, in-scope replication program 101 retrieves change records (i.e., transaction records) stored in a memory buffer and writes one or more change records to a redo record. For example, change records are stored in a memory buffer (not depicted) of source datastore 130 depicted in FIG. 1. One of ordinary skill will appreciate that a change record is a record of a change (i.e., change vector) made to data stored on a single data block that corresponds to a logical structure, such as a data table. Thus, each change record describes or represents a change made to a single data block of a database where the table data is stored. For example, if a user updates a salary value in a table including employee-related data, a change record that describes the change made to the table data is written to a memory buffer.

In various embodiments, in-scope replication program 101 creates a change record for each insertion, deletion or update of a table row. In-scope replication program 101 writes each change record to a memory buffer in sequential time order based on the time in which the change occurred. In some embodiments, a change record is associated with changes made to a table row corresponding to an index page of an index. In other embodiments, a change record is associated with changes made to a table row corresponding to data.

At step S308, in-scope replication program 101 determines whether a change record includes changes made to data associated with an in-scope table. In embodiments of the invention, a determination as to whether a change record includes changes made to data associated with an in-scope table is made while in-scope replication program 101 is actively writing the change record to a redo record. In embodiments of the invention, in-scope replication program 101 determines whether a change record includes changes made to data associated with an in-scope table based, at least in part, on determining that an object identifier (ID) of a table row associated with the data included in the change record is linked to an object identifier of an in-scope table and/or partition. For example, in-scope replication program 101 identifies object identifier "ObjectID_12345" while writing a change record to a redo record and links "ObjectID_12345" to Object ID_123 of an in-scope table.

In another example, in-scope replication program 101 identifies a data block address (e.g., unique ID or unique network addressable ID) while writing a change record to a redo record. Based on identifying the data block address, in-scope replication program 101 accesses a table directory on the data block to retrieve an object (ID) of a table and/or partition having table rows stored on the data block. Accordingly, in-scope replication program 101 determines that a change record includes changes made to data stored in an in-scope table based on matching the object ID and/or partition object ID to a database table index that lists the tables, partitions and/or rows (and their corresponding object IDs) that have been designated for replication by a system administrator.

At step S310, in-scope replication program 101 updates a transaction log file. In various embodiments, in-scope replication program 101 updates a transaction log file while actively writing change records to a redo record. In some embodiments, a file header of a transaction log file is updated with information indicating that a redo record includes changes made to data associated with an in-scope table. In some embodiments, a file header of a transaction log file is updated with information indicating that a redo record includes changes made to data associated with an out-of-scope table.

In an embodiment, updating a file header includes generating a replication index in the file header. Here, the replication index includes a set of object IDs associated with those redo records that include changes made to data stored in an in-scope table and a set of references that point to the location of a data block in the transaction log file where a redo record can be found. For example, if while writing "Change Record 3" to "Redo Record C" it is determined that "Change Record 3" includes changes made to data associated with an in-scope table, in-scope replication program 101 updates the replication index with the object ID of "Redo Record C" and a reference that points to "Data Block 15" where "Redo Record C" is located.

In an embodiment, updating a file header includes storing metadata in the file header of a transaction log file. For example, in-scope replication program 101 stores metadata in the file header that provides information as to those particular redo records of the transaction log file that include change records associated with data stored in in-scope tables. Similarly, in-scope replication program 101 stores metadata in the file header that provides information as to those particular redo records of the transaction log file that entirely contain change records associated with data stored in out-of-scope tables.

In an embodiment, updating the file header includes generating a flag (i.e., a predefined bit or bit sequence that holds a binary value) in the file header. For example, in-scope replication program 101 generates a first type of flag in the file header indicating that the entire transaction log file (i.e., all of the redo records encompassed within the transaction log file) contains changes made to data stored in in-scope tables. In another example, in-scope replication program 101 generates a second type of flag in the file header indicating that a portion of the transaction log file (i.e., one or more redo records encompassed within the transaction log file) includes changes made to data stored associated in-scope tables. In yet another example, in-scope replication program 101 generates a third type of flag in the file header indicating that the entire transaction log file (i.e., all of the redo records encompassed within the transaction log file) contains changes made to data associated with out-of-scope tables.

In other embodiments, in-scope replication program 101 updates a redo header of a redo record of a transaction log file. In an embodiment, updating a redo header includes storing metadata in a redo header that provides information as to those particular change records within a redo record that include changes made to data stored in an in-scope table. Similarly, in-scope replication program 101 stores metadata in a redo header that provides information as to those particular change records within a redo record that entirely contain changes made to data stored in out-of-scope tables.

In an embodiment, in-scope replication program 101 updates the redo header by generating a flag in the redo header. For example, in-scope replication program 101 generates a first type of flag in the redo header indicating that the entire redo record contains changes made to data associated with in-scope tables. In another example, in-scope replication program 101 generates a second type of flag in the redo header indicating that a redo record includes a particular number change records associated with data stored in an-scope record. In yet another example, in-scope replication program 101 generates a third type of flag in the redo header indicating that an entire redo record contains changes made to data associated with out-of-scope tables.

At step S312, in-scope replication program 101 archives a transaction log file in storage. In embodiments of the invention, the transaction log file is archived in storage once a transaction log file is full (i.e., no free data space remains). For example, transaction log files are archived in a database (not depicted) that is physically distinct from source database 160 of source datastore 130 depicted in FIG. 1.

Figure 4:
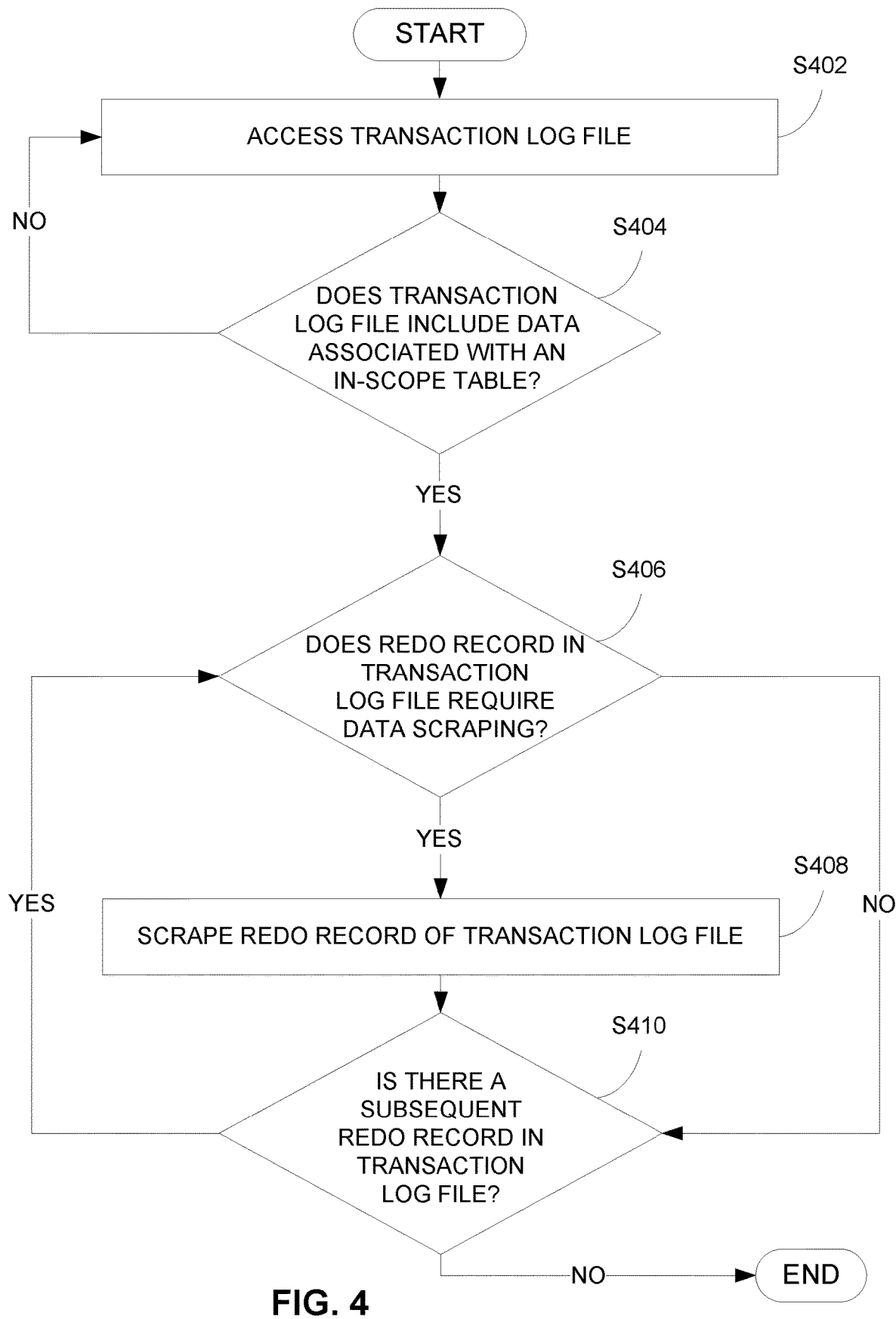
FIG. 4 is a flow chart diagram depicting operational steps by in-scope replication program 101 for performing data scraping of redo records of a transaction log file in accordance with at least one embodiment of the invention.

FIG. 4 is a flow chart diagram depicting operational steps by the in-scope replication program 101 for performing data scraping of redo records of a transaction log file in accordance with at least one embodiment of the invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

At step S402, in-scope replication program 101 accesses a transaction log file from storage. For example, in-scope replication program 101 accesses a transaction log file stored on source datastore 130 depicted in FIG. 1. In some embodiments, in-scope replication program 101 accesses a transaction log file in response to receiving a request for replicating changes made to data associated with in-scope tables from a source database to a target database. For example, in-scope replication program 101 receives an instruction to scrape redo records at predefined time intervals or at a predesignated time. In another example, in-scope replication program 101 scrapes redo records in response to receiving user input. In other embodiments, in-scope replication program 101 continuously scrapes redo records from transaction log files that are archived in storage.

In various embodiments, in-scope replication program 101 accesses "offline" transaction log files. One of ordinary skill will appreciate that an "offline" transaction log file is a log file that has been archived. Accordingly, in these embodiments, in-scope replication program 101 does not access a transaction log file until the changes recorded in all redo records in a transaction log file have been written to their corresponding data blocks on the source database and the transaction log file has been archived. In these embodiments, in-scope replication program 101 sequentially retrieves transaction file logs from archive storage based on the time in which a transaction log file is archived. For example, a first transaction log file that was archived on Apr. 16, 2019 at 09:15 am is accessed prior to a second transaction log file that was archived on Apr. 16, 2019 at 11:17 am.

At decision step S404, in-scope replication program 101 determines whether a transaction log file includes at least one redo record having at least one change record associated with an in-scope table. In other words, in-scope replication program 101 determines whether a transaction log file includes at least one change to data written to a source database that is associated with a table selected for replication with a target database.

In some embodiments, in-scope replication program 101 determines whether a redo record includes a change record associated with an in-scope table based, at least in part, on accessing the replication index. For example, in-scope replication program 101 determines that a transaction log file does include changes to data that need to be replicated (i.e., at least one change to data is associated with an in-scope table) based on the replication index having one or more references that point to data blocks where redo records can be located. In another example, in-scope replication program 101 determines that a transaction log file does not include any changes to data that need to be replicated (i.e., all changes to data are associated with out-of-scope tables) based on the replication index being devoid of any references that point to a redo record.

In some embodiments, in-scope replication program 101 determines whether a transaction log file includes any data that needs to be replicated based on the information provided by the metadata included in the file header of the transaction log file. For example, the metadata may indicate that the transaction log file does not include any changes to data that need to be replicated. Similarly, the metadata may indicate that one or more particular redo records that include changes to data that need to be replicated.

In some embodiments, in-scope replication program 101 determines whether a transaction log file includes any data that needs to be replicated based on a type of flag associated with the file header. For example, a first type of flag indicates that all of the changes to data included in the transaction log file need to be replicated (i.e., all changes to data are associated with in-scope tables). In another example, a second type of flag indicates that a portion of the changes to data included in the transaction log file need to be replicated (i.e., a portion of the changes to data are associated with in-scope tables). In yet another example, a third type of flag indicates that none of the changes to data included in the transaction log file that need to be replicated (i.e., all of the changes to data are associated with out-of-scope tables).

If in-scope replication program 101 determines that a transaction log file does not include at least one redo record having at least one change record associated with data stored in an in-scope table (decision step NO branch,) in-scope replication program 101 returns to step S402 and accesses the next sequential transaction log file. If in-scope replication program 101 determines that a transaction log file does include at least one redo record having at least one change record associated with data stored in an in-scope table (decision step YES branch), in-scope replication program proceeds to decision step S406.

At decision step S406, in-scope replication program 101 determines whether a redo record in a transaction log file requires data scraping (i.e., the retrieval of information from any source, such as a computing device, database or Internet). Accordingly, in embodiments of the invention, in-scope replication program 101 only scrapes those redo records stored in a transaction log file that have at least one change record associated with data stored in an in-scope table.

One of ordinary skill will appreciate that embodiments of the present invention allow for determining whether a redo record includes changes made to data that need to be replicated prior to or without reading, parsing or otherwise scraping a transaction log file block by block, redo record by redo record and change record by change record. Rather, in-scope replication program 101 of the present invention determines whether a redo record includes changes made to data that need to be replicated based on accessing at least one of: (i) the file header of a transaction log file and (ii) a redo header of a redo record. Accordingly, embodiments of the present invention reduce the amount of computing resources and time required for asynchronous replication between a source database and target database by eliminating the performance of scraping entire redo records of a transaction log file that are devoid of any change records associated with in-scope tables.

In various embodiments where the file header of a transaction log file includes a replication index, in-scope replication program 101 accesses the replication index to locate the particular data blocks of a transaction log file that include redo records having change records associated with in-scope tables. For example, a replication index stored in the file header of a transaction log file includes: (i) a first column that lists the redo records (and their respective object IDs) that include change records associated with in-scope tables and (ii) a second column that lists references that point to the unique network addresses of data blocks where a particular redo record can be located. Accordingly, if the replication index includes a pointer to a data block where a particular redo record is located, then in-scope replication program 101 determines that the redo record located on the data block requires data scraping.

In various embodiments where the file header of a transaction log file does not include a replication index, in-scope replication program 101 accesses a redo header of a redo record to determine whether a redo record requires data scraping. In some embodiments where the redo header of a redo record includes a flag, in-scope replication program 101 determines whether the redo record requires scraping based on the type of information indicated by the flag. For example, a first type of flag may indicate that the entire redo record includes change records associated with data stored in an in-scope table. Accordingly, in-scope replication program 101 determines that the entire redo record requires data scraping. In another example, a second type of flag may indicate that the redo record includes a particular number of change records associated with data stored in an in-scope table. Accordingly, in-scope replication program 101 determines that at least a portion of the redo record requires data scraping. In yet another example, a third type of flag may indicate that the redo record only contains change records associated with data stored in an out-of-scope table. Accordingly, in-scope replication program 101 determines that the redo record does not require data scraping.

If in-scope replication program 101 determines that a redo record in a transaction log file does not require data scraping (decision step NO branch), in-scope replication program 101 skips scraping of the redo record and proceeds to decision step S410 to determine whether there is a subsequent redo record in the transaction log file. If in-scope replication program 101 determines that a redo record in a transaction log file does require data scraping (decision step YES branch), in-scope replication program 101 proceeds to step S408.

At step S408, in-scope replication program 101 scrapes the redo record in the transaction log file. In embodiments of the invention, in-scope replication program 101 scrapes a redo record in response to determining that the redo record includes at least one change record associated with an in-scope table. In various embodiments, scraping a redo record includes at least one of: (i) reading the contents of a redo record to identify change records and (ii) parsing a redo record into individual change records. In various embodiments, in-scope replication program 101 copies and transmits the in-scope change records to a target datastore for population with a target database, such as target database 170 depicted in FIG. 1. In some embodiments, in-scope change records are transmitted to a target datastore on an individual basis as each in-scope change record is identified. In other embodiments, in-scope change records are transmitted in batches at predefined time intervals. In these embodiments, in-scope change records are temporarily stored in memory on a source datastore, such as source datastore 130 depicted in FIG. 1.

In those embodiments where a redo header includes a flag indicating a particular number of change records included in the redo record having data associated with in-scope tables, in-scope replication program 101 increments a count of change records each time a change record is identified as having data associated with an in-scope table. Once the count reaches a threshold number of change records indicated by the flag, in-scope replication program 101 terminates scaping of the redo record and proceeds to decision step S410 to determine whether there is a subsequent redo record in the transaction log file. Accordingly, a waste of computing resources and time directed to the scraping of additional change records included in a redo record that are associated with data stored in out-of-scope tables is avoided.

At decision step S410, in-scope replication program 101 determines whether there is a subsequent redo record in a transaction log file. If in-scope replication program 101 determines that there is not a subsequent redo record in the transaction log file (decision step NO branch), the process terminates. In alternative embodiments, if there are no more redo records in the transaction log file, in-scope replication program returns to step S402 and accesses a subsequent transaction log file archived on a source datastore, such as source datastore 130 depicted in FIG. 1. If in-scope replication program 101 determines that there is a subsequent redo record in the transaction log file (decision step YES branch), in-scope replication program 101 returns to decision step S406.

Figure 5:
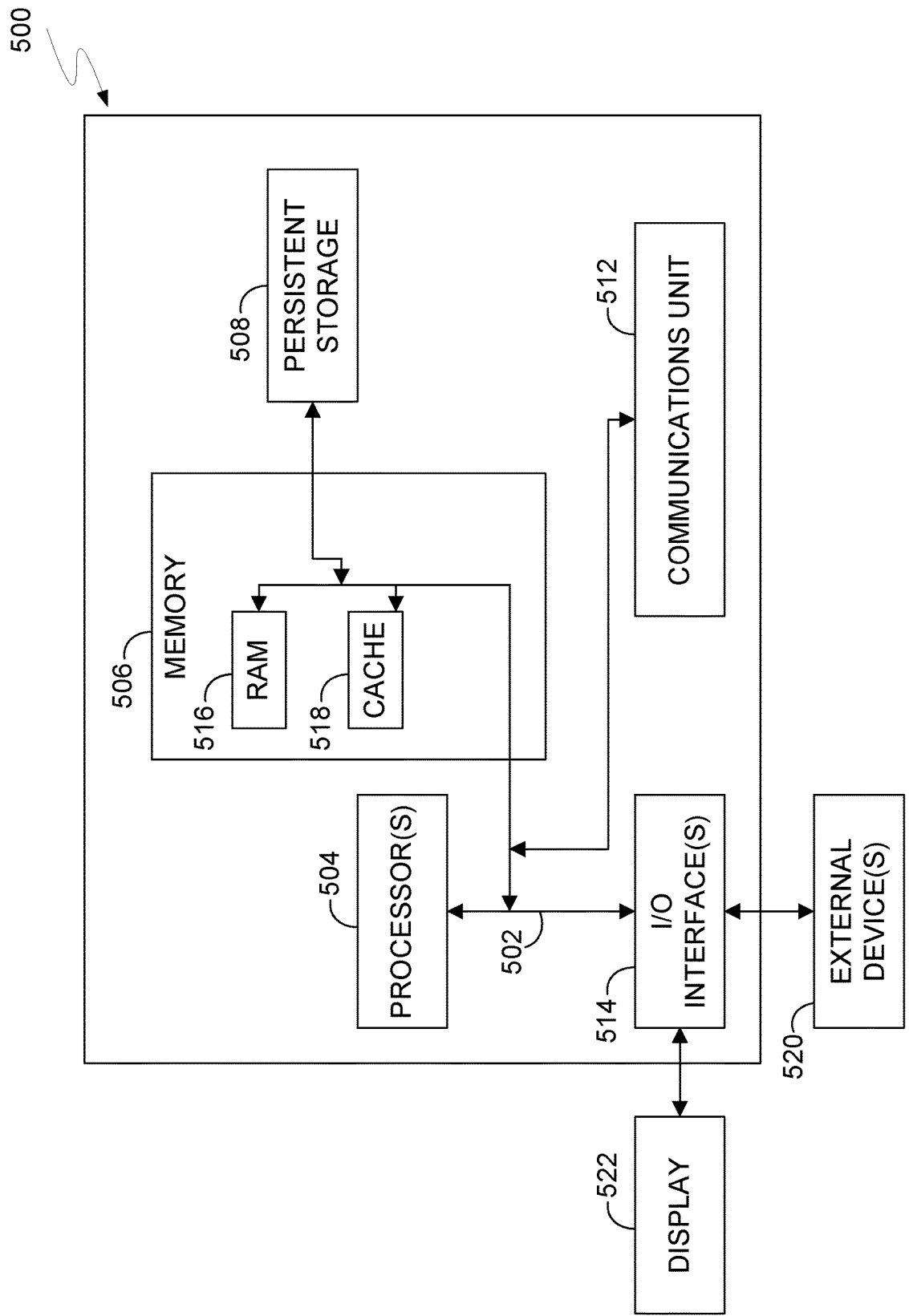
FIG. 5 is a block diagram depicting components of a computing device, generally designated 500, suitable for executing in-scope replication program 101 in accordance with at least one embodiment of the invention.

FIG. 5 is a block diagram depicting components of a computing device, generally designated 500, suitable for executing in-scope replication program 101 in accordance with at least one embodiment of the invention. Computing device 500 includes one or more processor(s) 504 (including one or more computer processors), communications fabric 502, memory 506 including, RAM 516 and cache 518, persistent storage 508, communications unit 512, I/O interface(s) 414, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile one or more computer readable storage media.

Program instructions for in-scope replication program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
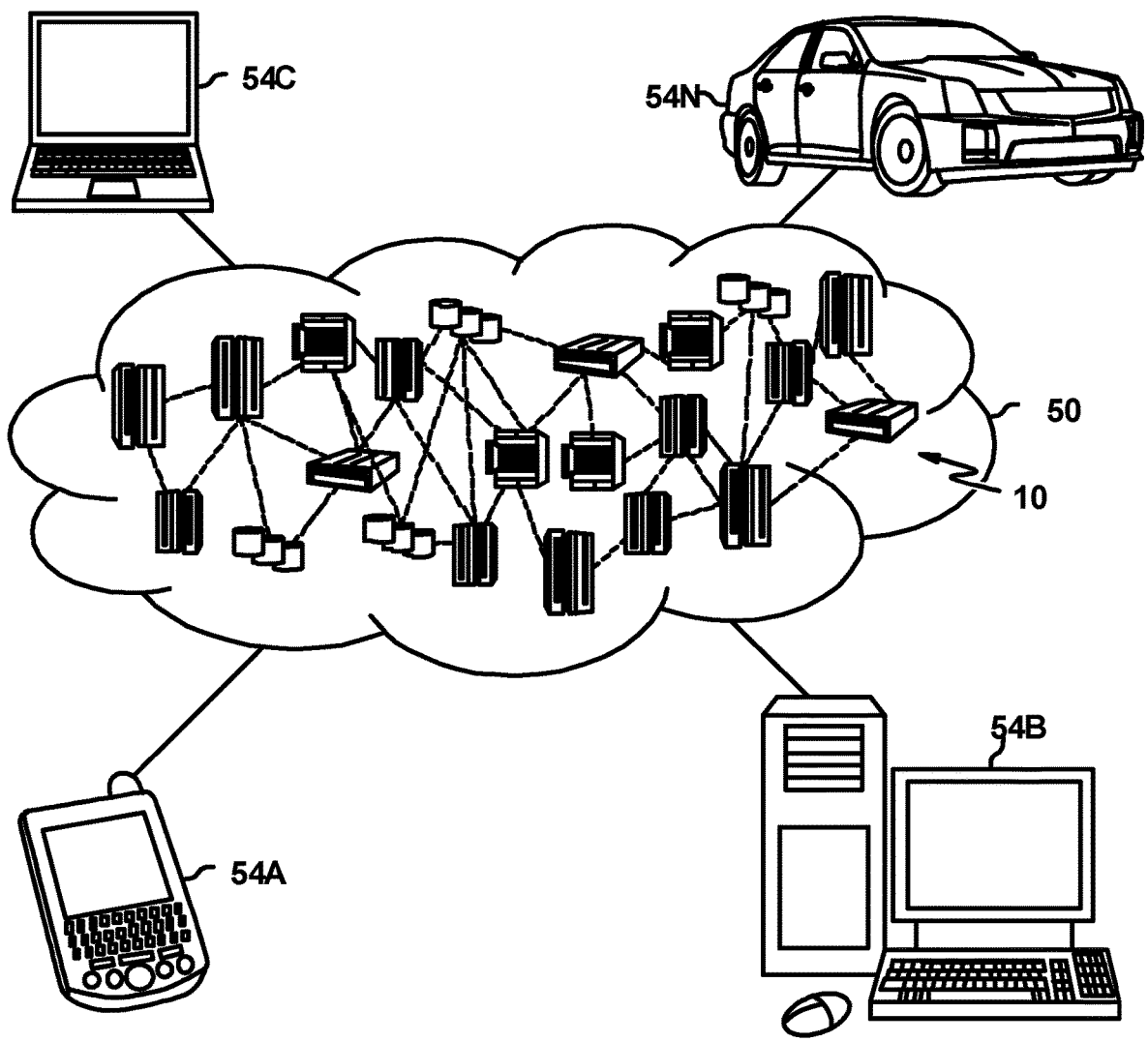
FIG. 6 is a block diagram depicting a cloud computing environment in accordance with at least one embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
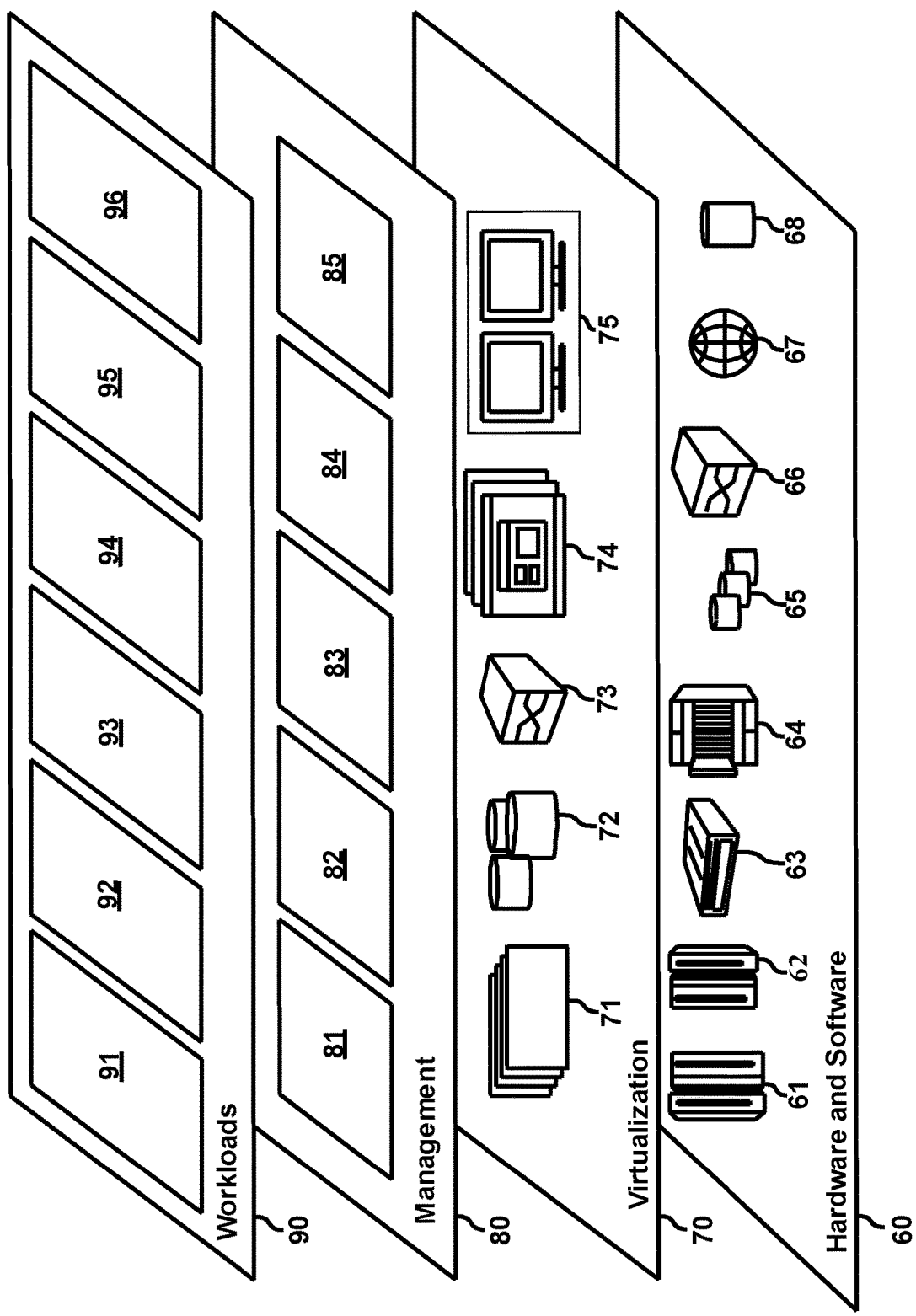
FIG. 7 is block diagram depicting abstraction model layers in accordance with at least one embodiment of the present invention.

FIG. 7 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in-scope replication program 101.

What is claimed is:

1. A computer-implemented method for asynchronous replication between a source database and a target database, the computer-implemented method comprising:

determining, by one or more processors, while writing a first change record to a first redo record of a first transaction log file, that the first change record includes at least one change made to a first database table of a source database that is in-scope for replication between the source database and a target database;

modifying, by one or more processors, a header of the first transaction log file to include information indicating that the first redo record includes a change made to a database table that is in-scope for replication between the source database and the target database; and responsive to receiving, by one or more processors, an instruction to replicate changes made to database tables that are in-scope for replication between the source database and the target database:
  determining, by one or more processors, to scrape the first redo record to extract the change made to the first database table of the source database from the first redo record based, at least in part, on accessing the information included in the header of the first transaction log file indicating that the first redo record includes a change made to a database table that is in-scope for replication between the source database and the target database.

2. The computer-implemented method of claim 1, further comprising:
  retrieving, by one or more processors, each change record in the plurality of change records from a memory buffer in sequential time order from when each change record was written to the memory buffer.

3. The computer-implemented method of claim 1, further comprising:
  scraping, by one or more processors, the first redo record for the change made to the database table of the source database; and
  transmitting, by one or more processors, the change extracted from the first redo record to the target database for population with the target database.

4. The computer-implemented method of claim 1, further comprising:
  generating, by one or more processors, a flag in a header of the first redo record indicating that the first redo record includes a change made to a database table that is in-scope for replication between the source database and the target database.

5. The computer-implemented method of claim 4, wherein determining, by one or more processors, to scrape the first redo record for the change made to the first database table of the source database is further based, at least in part, on:
  identifying, by one or more processors, the flag in the header of the first redo record indicating that the first redo record includes a change made to a database table that is in-scope for replication between the source database and the target database.

6. The computer-implemented method of claim 1, further comprising:
  determining, by one or more processors, while writing a second change record to a second redo record of the first transaction log file that the second change record only includes changes made to a second database table of the source target database that is out-of-scope for replication between the source database and the target database; and
  modifying, by one or more processors, the header of the first transaction log file to include information indicating that the second redo record only includes changes made to a database table that is out-of-scope for replication between the source database and the target database.

7. The computer-implemented method of claim 6, further comprising:
  generating, by one or more processors, a flag in a header of the second redo record indicating that the second redo record only includes changes made to a database table that is out-of-scope for replication between the source database and the target database.

8. The computer-implemented method of claim 6, further comprising:
  determining, by one or more processors, to skip scraping of the second redo record for any recorded changes made to the second database table of the source database based, at least in part, on accessing the information included in the header of the first transaction log file indicating that the second database is out-of-scope for replication between the source database and the target database.

9. The computer-implemented method of claim 1, wherein determining that the first change record includes at least one change made to the first database table of the source database that is in-scope for replication between the source database and the target database is based, at least in part on:
  determining, by one or more processors, that an object identifier of a table row associated with the change record is linked to an object identifier of the first database designated as being in-scope for replication.

10. A computer program product for asynchronous replication between a source database and a target database, the computer program product comprising one or more computer readable storage media and program instructions stored on the one or more computer readable storage media, the program instructions including instructions to:
  determine, while writing a first change record to a first redo record of a first transaction log file, that the first change record includes at least one change to a first database table of a source database that is in-scope for replication between the source database and a target database;
  modify a header of the first transaction log file to include information indicating that the first redo record includes a change made to a database table that is in-scope for replication between the source database and the target database; and
  responsive to receiving an instruction to replicate changes made to database tables that are in-scope for replication between the source database and the target database:
    determine to scrape the first redo record to extract the change made to the first database table of the source database from the first redo record based, at least in part, on accessing the information included in the header of the first transaction log file indicating that the first redo record includes a change made to a database table that is in-scope for replication between the source database and the target database.

11. The computer program product of claim 10, further comprising instructions to:
  retrieve change records from a memory buffer in sequential time order from when each change record was written to the memory buffer.

12. The computer program product of claim 10, further comprising instructions to:
  scrape the first redo record to extract the change made to the database table of the source database; and transmit the change extracted from the first redo record to the target database for population with the target database.

13. A computer system for asynchronous replication between a source database and a target database, the computer system comprising:
   one or more computer processors;
   one or more computer readable storage media;
   computer program instructions;
   the computer program instructions being stored on the one or more computer readable storage media for execution by the one or more computer processors; and
   the computer program instructions including instructions to:
      determine, while writing a first change record to a first redo record of a first transaction log file, that the first change record includes at least one change to a first database table of a source database that is in-scope for replication between the source database and a target database;
      modify a header of the first transaction log file to include information indicating that the first redo record includes a change made to a database table that is in-scope for replication between the source database and the target database; and
      responsive to receiving an instruction to replicate changes made to database tables that are in-scope for replication between the source database and the target database:
         determine to scrape the first redo record to extract the change made to the first database table of the source database from the first redo record based, at least in part, on accessing the information included in the header of the first transaction log file indicating that the first redo record includes a change made to a database table that is in-scope for replication between the source database and the target database.

* * * * *